US012254778B2

(12) United States Patent
Meng et al.

(10) Patent No.: US 12,254,778 B2
(45) Date of Patent: Mar. 18, 2025

(54) AIRCRAFT CONFLICT DETECTION AND RESOLUTION

(71) Applicant: General Electric Company, Schenectady, NY (US)

(72) Inventors: Baoluo Meng, Frisco, TX (US); Szabolcs Andras Borgyos, Grand Rapids, MI (US); Michael Richard Durling, Gansevoort, NY (US); Saswata Paul, Troy, NY (US)

(73) Assignee: General Electric Company, Evendale, OH (US)

( * ) Notice: Subject to any disclaimer, the term of this patent is extended or adjusted under 35 U.S.C. 154(b) by 198 days.

(21) Appl. No.: 17/853,478

(22) Filed: Jun. 29, 2022

(65) Prior Publication Data

US 2024/0005802 A1 Jan. 4, 2024

(51) Int. Cl.
*G08G 5/00* (2006.01)
*G08G 5/04* (2006.01)

(52) U.S. Cl.
CPC ......... *G08G 5/0034* (2013.01); *G08G 5/0043* (2013.01); *G08G 5/006* (2013.01); *G08G 5/0069* (2013.01); *G08G 5/045* (2013.01)

(58) Field of Classification Search
CPC .... G08G 5/0034; G08G 5/0043; G08G 5/006; G08G 5/0069; G08G 5/045; G08G 5/0039
See application file for complete search history.

(56) References Cited

U.S. PATENT DOCUMENTS

2008/0288164 A1 11/2008 Lewis et al.
2012/0083997 A1* 4/2012 Meador ............. G06Q 10/0631 701/120

(Continued)

FOREIGN PATENT DOCUMENTS

EP 3373273 A1 9/2018
EP 3518212 A1 7/2019

OTHER PUBLICATIONS

Katz, Guy et al.. "Repluplex: An Efficient SMT Solver for Verifying Deep Neural Networks". (Year: 2017).*

(Continued)

*Primary Examiner* — Hunter B Lonsberry
*Assistant Examiner* — Henry R Hinton
(74) *Attorney, Agent, or Firm* — Enang Akan; Darrow Mustafa PC

(57) ABSTRACT

Methods, apparatus and systems for generating verifiable conflict-free flight plans for aircraft are disclosed. In an embodiment, a server computer receives a set of air traffic flight plans for an airspace that includes elements, and receives at least two of aerodynamic constraint data, business constraint data and operational constraint data for an aircraft. The server computer then generates using a first constraint satisfaction solver, a plurality of candidate flight plans for the aircraft based on the at least two of the aerodynamic constraint data, the business constraint data and the operational constraint data. The server computer next checks, utilizing a second constraint solver, for conflicts with the elements of the air traffic flight plans for the airspace, and provides at least one verifiable conflict-free flight plan for the aircraft from the plurality of candidate flight plans when a candidate flight plan is conflict-free from all of the elements of the set of air traffic flight plans.

18 Claims, 8 Drawing Sheets

(56) References Cited

U.S. PATENT DOCUMENTS

| | | | | |
|---|---|---|---|---|
| 2020/0226464 | A1* | 7/2020 | Warren | G06N 3/08 |
| 2021/0097870 | A1* | 4/2021 | Nakadai | G06Q 50/14 |
| 2023/0089833 | A1* | 3/2023 | Bonnoit | G01C 21/20<br>701/120 |
| 2023/0112803 | A1* | 4/2023 | Herriot | G08G 5/0034<br>701/415 |
| 2023/0368681 | A1* | 11/2023 | Altus | G08G 5/065 |

OTHER PUBLICATIONS

"Reluplex: An Efficient SMT Solver for Verifying Deep Neural Networks' Guy Katz | 2017". Conference on Computer-Aided Verfication, Youtube. https://www.youtube.com/watch?v=KiKS_zaPb64. (Year: 2017).*

European Search Report issued in corresponding European Patent Application No. EP 23181664.6, mailed Dec. 5, 2023, 10 pages.

Katz et al., "Reluplex: An Efficient SMT Solver for Verifying Deep Neural Networks", arXiv:1702.01135v2, May 19, 2017, 31 pages.

* cited by examiner

| NOTATION | DESCRIPTION | SMT DECLARATION |
|---|---|---|
| $S_{x,t,X}$ | POSITION OF AN AIRCRAFT IN THE X AXIS | (DECLARE-CONST s_x_t_X REAL) |
| $S_{y,t,X}$ | POSITION OF AN AIRCRAFT IN THE Y AXIS | (DECLARE-CONST s_y_t_X REAL) |
| $S_{z,t,X}$ | POSITION OF AN AIRCRAFT IN THE Z AXIS | (DECLARE-CONST s_z_t_X REAL) |
| $V_{xy,t,X}$ | VELOCITY OF AN AIRCRAFT IN THE XY PLANE | (DECLARE-CONST v_xy_t_X REAL) |
| $V_{z,t,X}$ | VELOCITY OF AN AIRCRAFT IN THE Z AXIS | (DECLARE-CONST v_z_t_X REAL) |
| $\lambda_{t,X}$ | TRUE HEADING OF AN AIRCRAFT IN THE XY PLANE | (DECLARE-CONST l_t_X REAL) |
| $V_{x,t,X}$ | VELOCITY OF AN AIRCRAFT IN THE X AXIS | (DECLARE-CONST v_x_t_X REAL) |
| $V_{y,t,X}$ | VELOCITY OF AN AIRCRAFT IN THE Y AXIS | (DECLARE-CONST s_y_t_X REAL) |
| $S_{x,t}$ | RELATIVE POSITION IN THE X AXIS | (DECLARE-CONST s_x_t REAL) |
| $S_{y,t}$ | RELATIVE POSITION IN THE Y AXIS | (DECLARE-CONST s_y_t REAL) |
| $V_{x,t}$ | RELATIVE VELOCITY IN THE X AXIS | (DECLARE-CONST v_x_t REAL) |
| $V_{y,t}$ | RELATIVE VELOCITY IN THE Y AXIS | (DECLARE-CONST v_y_t REAL) |
| $S_{z,t}$ | RELATIVE POSITION IN THE Z AXIS | (DECLARE-CONST s_z_t REAL) |
| $V_{z,t}$ | RELATIVE VELOCITY IN THE Z AXIS | (DECLARE-CONST v_z_t REAL) |

FIG. 5

AIRCRAFT CONFLICT DETECTION AND RESOLUTION

BACKGROUND

By the year 2030 there are predicted to be more than four hundred thousand (400,000) aircraft, including Unmanned Aircraft Systems (UAS), Advanced Air Mobility (AAM) and Urban Air Mobility (UAM) aircraft, operating in the United States National Airspace System (NAS). These operations will routinely fly Beyond Visual Line of Sight (BVLOS) of the ground-based operator and perform missions such as package delivery, inspection and personal transport. To ensure safety, every operation must prove and demonstrate that it can safely share the airspace with other users. Thus, the Federal Aviation Administration (FAA), the National Aeronautics and Space Administration (NASA) and other industry participants have invested in developing and demonstrating rules and technologies for safely separating UAS from other users of airspace. Automatic conflict detection and resolution mitigates the air and ground risks resulting from the operation of UAS. $\overline{F}_o{}^{-}Fo$ The FAA therefore requires that all operators certify that the risk they impose on airspace users and ground-based non-participants meets a target level of safety. To ensure that these safety targets are attained, operators need to prove that their operational procedures and systems, including Conflict Detection and Resolution solutions, can be trusted and assured to provide adequate airspace separation from all users within the NAS. It has been recognized that to accommodate the FAA requirements, there is a need for smarter and autonomous Air-Traffic Management (ATM) techniques which will be better suited to deal with high-density air traffic than the traditional system of human-operated air-traffic control (ATC). It has also been recognized that autonomous ATM systems can be deployed in either a centralized or a decentralized manner, but in both configurations such autonomous ATM systems must be capable of ensuring separation between the aircraft to prevent catastrophic incidents like collisions and near mid-air collisions (NMAC).

Two types of approaches are commonly used for maintaining standard separation between aircraft. The first type concerns tactical approaches which are effective in resolving imminent conflicts between aircraft by using tactical maneuvers. The second type concerns strategic coordination approaches which can be used for detecting and resolving conflicts between aircraft by monitoring their operational intent or planned flight volumes, either prior to or during their execution. These approaches are deployed as complimentary layers of safety within airspace, include differing technologies and workflows, and operate at differing time horizons. Strategic separation solves conflicts with long time horizons, for example those greater than 2 minutes from potential impact. Tactical separation resolves conflicts on a shorter time horizon, for example those within a 1-2-minute time horizon. However, the longer look-ahead times of strategic approaches allows the aircraft to be better prepared for uncertainties and the maneuvers that may need to be executed for conflict resolution, whereas tactical maneuvers usually require almost instantaneous reactions by pilots and air traffic controllers.

NASA and the aviation industry are developing Unmanned Aircraft System Traffic Management (UTM), which is a "traffic management" ecosystem which is separate from, but complementary to the FAA's ATM system. UTM is a conflict detection and resolution methodology that relies on using aircraft operational intents encompassing operational flight volumes to detect conflicts between flight operations. Instead of reliance on a central authority, such as an air traffic controller or equivalent automation system, the approach relies on federated service providers to exchange operational intents across a network, approve conflict-free operations and monitor their execution. The service providers utilize both authoritative and non-authoritative data to provide authoritative services to their respective clients. An industry standard defines the interfaces that enable the data exchanges, discovery and synchronization across service providers. However, a set of performance requirements, and/or service provider deployment qualifiers have not yet been specified. Thus, several implementations and deployment approaches may exist for synchronizing services providers and mitigating risk of service provider failures, ensuring that only trusted operational data is propagated across the airspace service provider network.

In a first implementation, service providers may be certified to a performance requirement such as a Minimum Operational Performance Standard (MOPS) for providing services within an airspace. The MOPS could be a globally scoped MOPS with a single level of performance or with different levels of performance, scoped to airspace risk, or it could be a local or regional specification. As part of service provider onboarding, each provider could demonstrate a certification against the MOPS, ensuring they individually meet the performance (i.e., integrity and availability) necessary for providing services within that airspace. However, a MOPS does not currently exist and the risks, and thus levels of performance required, across different airspaces can vary greatly.

In a second implementation, service providers undergo onboarding certification specific to the airspace and operational authorization held by the local operating authority. This certification may include simulation and flight testing to demonstrate performance against the certificate of authorization held by the local authority or airspace operating entity. The challenge with this approach is that each operating authority must develop onboarding tests specific to their needs and each service provider must perform onboarding in each airspace, which is not scalable or desired.

In a third implementation, a certifiable automated test-suite for authorizing the performance of each service provider is used for onboarding service providers into each local airspace. The test suite is comprised of an Artificial Intelligence (AI) or agent that adaptively queries the candidate service provider with scenarios, data and messages that simulate the local operational conditions and airspace environment. The performance of the candidate service providers is recorded and analyzed for correctness. If the failure likelihood of the candidate is proven acceptable relative to the local airspace's certificate of authorization, the agent provides a third-party verifiable performance certificate that provides the service provider with a performance authorization to operate within the local airspace. The performance authorization may be repeated periodically as the underlying airspace concept of use, authorization or service provider software are updated.

In a fourth implementation, the service provider does not need to perform any on-boarding to provide services within a local airspace. Instead, a set of services are provided by the local authority that authorize the service provider performance on a per-use basis. That is, in real-time, as the service provider queries authoritative databases and interacts with peer service providers across the UTM network, a performance authorization service verifies and authorizes each flight request, providing a third-party verifiable certificate for each request. The certificate is utilized for individual flight approval.

Each implementation outlined above relies on trusted conflict detection and resolution algorithms capable of detecting conflicts between a given flight plan for an ownship and a set of traffic flight plans for an airspace, or trajectory predictions based on tracks of adjacent aircraft traffic. There are multiple ways for achieving trust or demonstrating assurance for safety critical software in aviation, such as standard process-based approaches such as “DO-178C” certification for airborne software and/or “DO-278” certification for ground software. Additionally, there are formal methods-based approaches that can achieve trust or assurance, with additional benefits.

In one example, a formally verified conflict detection algorithm can also generate resolutions to avoid such conflicts. A flight plan is simply a collection of waypoints in the four-dimensional (4D) space where each waypoint is connected by a straight-line constant-velocity flight segment. In this example, the conflict resolution approach involves assigning appropriate values of ground speed to the flight segments in the ownship’s flight plan such that the ownship can maintain safe separation with the known traffic aircraft. A software implementation has been developed for this task, and verification of some correctness properties for an independent formal specification of the implementation has been provided using an interactive theorem proving system.

However, existing strategic conflict management approaches for aircraft do not enable formal verification of the outcome (or solution(s)) to be verified by an independent third party. Specifically, given a flight plan for an ownship $F_o$, a horizontal threshold, a vertical threshold, a set of aerodynamic, operational and business constraints “C,” a set of flight plans for traffic aircraft “S” and terrain information, a typical conflict management solution generates a conflict-free flight plan for the ownship $F_o'$ wherein there is no conflict between the $F_o'$ flight plan and any of the other flight plans in “S” and there is no conflict with any objects in the given terrain information while satisfying all the constraints in “C.”

Thus, there is a need for an Autonomous Air Traffic Management (ATM) system that implements an autonomous, strategic conflict detection and resolution process to generate conflict-free flight plans which can be independently verified by a third party to ensure safe separation between aircraft.

SUMMARY

Presented are methods and apparatus for generating verifiable conflict-free flight plans for aircraft. In some embodiments, a server computer receives a set of air traffic flight plans for an airspace from a user device, wherein the set of air traffic flight plans includes elements and at least two of aerodynamic constraint data, business constraint data and operational constraint data for an aircraft, then generates by utilizing a first constraint satisfaction solver, a plurality of candidate flight plans for the aircraft based on the at least two of the aerodynamic constraint data, the business constraint data and the operational constraint data. The server computer then uses a second constraint solver to check each candidate flight plan as it is generated for conflicts with the elements of the air traffic flight plans for the airspace, and then provides, by using the second constraint solver, at least one verifiable conflict-free flight plan for the aircraft from the plurality of candidate flight plans when a candidate flight plan is conflict-free from all of the elements of the set of air traffic flight plans.

In some embodiments, the process may include the server computer generating a proof certificate for the verifiable conflict-free flight plan and may include transmitting the proof certificate to a third-party server for enabling formal verification of the verifiable conflict-free flight plan. In addition, the method may include transmitting the verifiable conflict-free flight plan to at least one of the user device and an authoritative registry of flight plans.

In some implementations, at least one of the first constraint satisfaction solver and the second constraint satisfaction solver may be a Satisfiability Modulo Theories (SMT) solver. In addition, the business constraint data may include at least one of total fuel cost constraint data and total operational cost constraint data whereas the operational constraint data may includes at least one of operational risk data, arc length constraint data, operational area data, operational volume data, altitude data, and total flight time constraint data.

In another aspect, disclosed is an apparatus for generating verifiable conflict-free flight plans for aircraft. In some embodiments, the apparatus includes a processor, a communication device operably connected to the processor, and a storage device operably connected to the processor. The storage device includes processor executable instructions which when executed cause the processor to receive a set of air traffic flight plans for an airspace including elements and at least two of aerodynamic constraint data, business constraint data and operational constraint data for an aircraft; generate, utilizing a first constraint satisfaction solver, a plurality of candidate flight plans for the aircraft based on the at least two of the aerodynamic constraint data, the business constraint data and the operational constraint data; check, utilizing a second constraint solver as each candidate flight plan is generated, for conflicts with the elements of the air traffic flight plans; and provide, using the second constraint solver, at least one verifiable conflict-free flight plan for the aircraft from the plurality of candidate flight plans when the verifiable conflict-free flight plan is conflict-free from all of the elements of the set of traffic flight plans.

In some embodiments, the storage device may include further processor executable instructions which when executed cause the processor to generate a proof certificate for the verifiable conflict-free flight plan and may include further processor executable instructions which when executed cause the processor to transmit the proof certificate to a third-party server enabling formal verification of the verifiable conflict-free flight plan. In addition, the storage device may include processor executable instructions which when executed cause the processor to transmit the verifiable conflict-free flight plan to at least one of the user device and an authoritative registry of flight plans. In some implementations, at least one of the first constraint satisfaction solver and the second constraint satisfaction solver may be a Satisfiability Modulo Theories (SMT) solver, the business constraint data may include at least one of total fuel cost constraint data and total operational cost constraint data, and the operational constraint data may include at least one operational risk data, arc length constraint data, operational area data, operational volume data, altitude data, and total flight time constraint data.

In another aspect, disclosed is a method for updating an authoritative conflict-free flight plan directory. In some embodiments, a server computer associated with an authoritative flight plan registry receives, from a plurality of user devices, a plurality of candidate conflict-free flight plans for an airspace; retrieves, from a database, constraint data for the airspace, restriction data for the airspace, and a plurality of verified conflict-free flight plans associated with the airspace; verifies on a first-in basis, by using a constraint satisfaction solver, that a candidate conflict-free flight plan of the plurality of candidate conflict-free flight plans is conflict-free; and stores in the authoritative flight plan registry, the candidate conflict-free flight plan as a verified conflict-free flight plan. In some embodiments, the constraint satisfaction solver comprises a Satisfiability Modulo Theories (SMT) solver.

In some implementations, wherein verifying that a candidate conflict-free flight plan of the plurality of candidate conflict-free flight plans is conflict-free, the server computer determines that no conflicts exist between data defining the candidate conflict-free flight plan and the constraint data, the restriction data, and data defining the verified conflict-free flight plan data. In addition, the server computer may transmit a notification to a user device that the candidate conflict-free flight plan has been verified, may generate a proof certificate for the verified conflict-free flight plan, and/or may transmit the proof certificate to a third party for formal verification.

In some implementations, the process may include, after retrieving the constraint data for the airspace, the restriction data for the airspace, and the plurality of verified conflict-free flight plans associated with the airspace, the server computer determining using a constraint satisfaction solver, that a candidate conflict-free flight plan of the plurality of candidate conflict-free flight plans is not conflict-free; rejecting the candidate conflict-free flight plan, and then transmitting a rejection notification to a user device of the plurality of user devices associated with the candidate conflict-free flight plan.

Technical advantages of embodiments disclosed herein include the presentation and/or characterization of the problem of conflict detection and resolution as a constraint satisfaction problem which advantageously allows for the use of state-of-the-art constraint solvers, such as SMT solvers, and the implementation of dReal to find conflict-free flight plan solutions. The use of SMT solvers allows for encoding arbitrary aerodynamic and/or operational constraints on resolutions which is appropriate for safety-critical aerospace systems because the solutions generated by the SMT solvers can be easily verified, for example, by third parties for correctness. The declarative paradigm advantageously allows the encoding of complex properties that can easily be verified for correctness and makes it possible to encode a wide variety of desirable constraints in addition to conflict elimination. Thus, machine-checkable proofs can be generated from SMT solvers and therefore proof certificates can also be generated for an unsatisfiable solution that detail how to derive a contradiction from the inputs. Accordingly, a solution generated for a satisfiability problem by an SMT solver can have a high degree of confidence associated with it since a satisfiable solution can be checked by straightforward means and proof certificates can be generated for an unsatisfiable solution that detail how to derive a contradiction from the inputs. Moreover, the proofs from an SMT solver can be independently checked by third-party theorem provers. Beneficially, the high-degree of confidence directly provided by SMT solvers makes this approach appropriate for safety-critical aerospace applications.

Accordingly, disclosed embodiments advantageously provide a strategic conflict detection and resolution process that involves setting up the task as a constraint satisfaction problem and using SMT solvers to find valid solutions. Such processes allow for encoding additional constraints in SMT-LIB to find valid solutions which are not just conflict-free but that also satisfy some desirable aerodynamic, business, and operational constraints. The declarative nature of the processes disclosed herein means that users need only provide desired constraints (such as operational and/or safety constraints) such that the users specify the "what" but do not have to deal with the "how" because the constraint solvers (which may be SMT solvers) take care of the "how" automatically.

BRIEF DESCRIPTION OF THE DRAWINGS

FIG. 5 is a table illustrating examples of the notations, descriptions and Satisfiability Modulo Theories (SMT) declarations used for describing the conflict detection logic according to some embodiments of the disclosure.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In general, and for the purposes of introducing concepts of novel embodiments described herein, autonomous Air Traffic Management (ATM) methods, systems and apparatus are disclosed. In some embodiments, the autonomous ATM process includes autonomously generating conflict-free flight plans for aircraft in a manner which can be independently verified by a third party to ensure safe separation between aircraft and prevent Mid-Air Collisions (MAC). In some implementations, a server computer receives a set of air traffic flight plans including elements and at least two of aerodynamic constraint data, business constraint data and operational constraint data from a user device. The server computer then generates a plurality of candidate flight plans utilizing a constraint satisfaction solver, checks each candidate flight plan as it is generated for conflicts with the elements of the air traffic flight plans, verifies at least one candidate flight plan of the plurality of candidate flight plans as conflict-free when at least one candidate flight plan is conflict-free from all of the elements of the set of traffic flight plans, and then generates a final flight plan. In some implementations, the server computer also generates a proof certificate and transmits it along with the final flight plan to a third-party server to enable formal verification of the final flight plan. The server computer may also transmit the proof certificate and the final flight plan to the user device.

Figure 1:
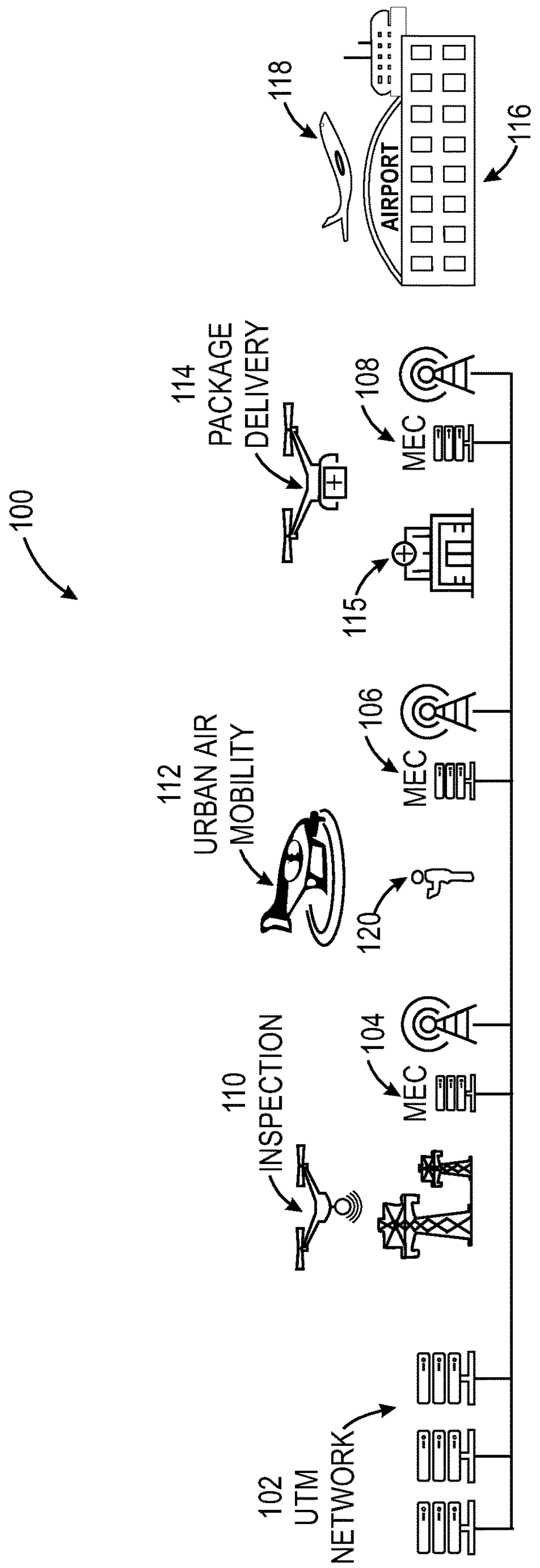
FIG. 1 is a block diagram illustrating an example of a low altitude aerial mobility corridor environment.

FIG. 1 is a block diagram illustrating an example of a low altitude aerial mobility corridor environment 100. In this example, an Unmanned Aircraft System Traffic Management (UTM) network 102 is responsible for tracking Unmanned Aircraft Systems (UAS's) and ensuring safe operation in the low altitude airspace. The UTM network 102 is operably connected to a plurality of Multi-access Edge Computers (MECs) 104, 106 and 108 which may function to receive data from, and transmit data to, a plurality of Unmanned Aircraft Systems (UAS's) such as drones 110, 112 and 114. For example, the UAS 110 may be operating under a first flight plan which permits inspection of high-voltage power lines, the UAS 112 may be operating under control of a ground-based pilot 120 according to a second flight plan for observing automobile traffic patterns on roadways (not shown), and the UAS 114 may be operating under a third flight plan which allows for the delivery of packages to a hospital 115 located near an airport 116 servicing manned aircraft 118. Thus, the UTM network 102 may be tasked with ensuring that the first, second and third flight plans are conflict-free from each other while also ensuring that the drones operate a safe distance from the airport 116 and any manned aircraft 118.

Figure 2:
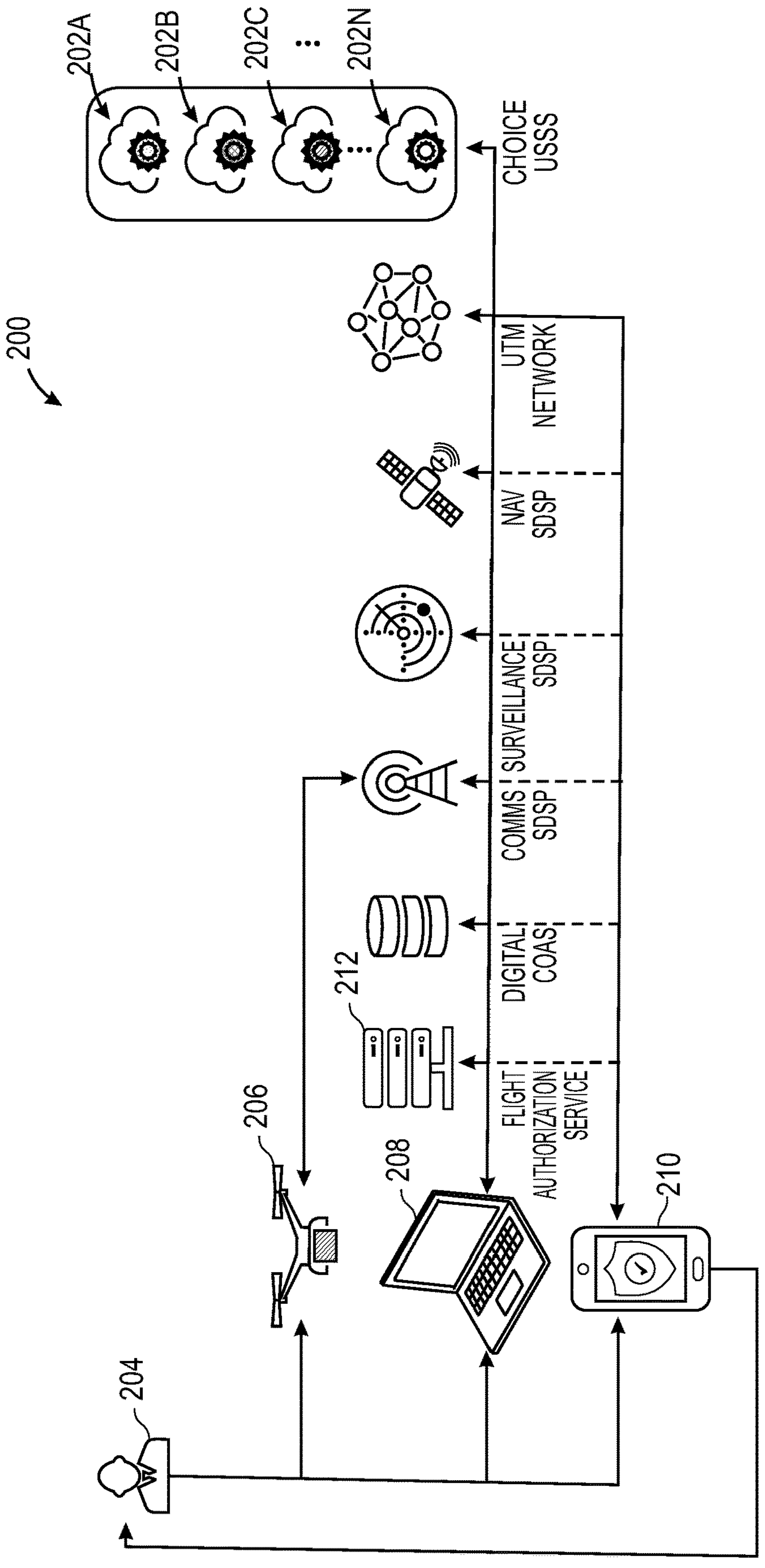
FIG. 2 is a schematic diagram of an example of a pre-flight system for attaining a flight authorization for a Unmanned Aircraft System (UAS).

FIG. 2 is a schematic diagram of a pre-flight system 200 for attaining a flight authorization for a UAS (such as a drone 206). In the pre-flight system, one or more of a plurality of UAS Service Suppliers (USSs) 202A to 202N may be utilized to enable the safe, secure, and efficient use of a designated airspace. A USS acts as a communication bridge between governmental aviation authorities and drone operators, and provides services to plan, monitor and execute safe missions within the airspace.

Referring again to FIG. 2, in an embodiment an operator 204 of a drone or ownship 206 may be required by law or regulation to file a flight plan before operating the drone in a designated airspace. The operator 204 therefore may use a laptop computer 208, for example, to generate a flight plan and then use a mobile device 210 to request a flight authorization (FA) from a flight authorization service (FAS) 212. In this embodiment, the FAS may provide a third-party verifiable certificate that demonstrates that the operator's choice USS (202 A-N) has accurately detected and resolved strategic airspace conflicts. This certificate is part of the flight approval process which is required for the owner and/or operator to fly his or her mission. In this embodiment, the FAS 212 verifies whether the strategic conflict detection and resolution service within the choice USS should be trusted. In case the strategic deconfliction cannot be verified, the choice USS is likely to have succumbed to a logical failure and the flight is not authorized as requested.

Figure 3:
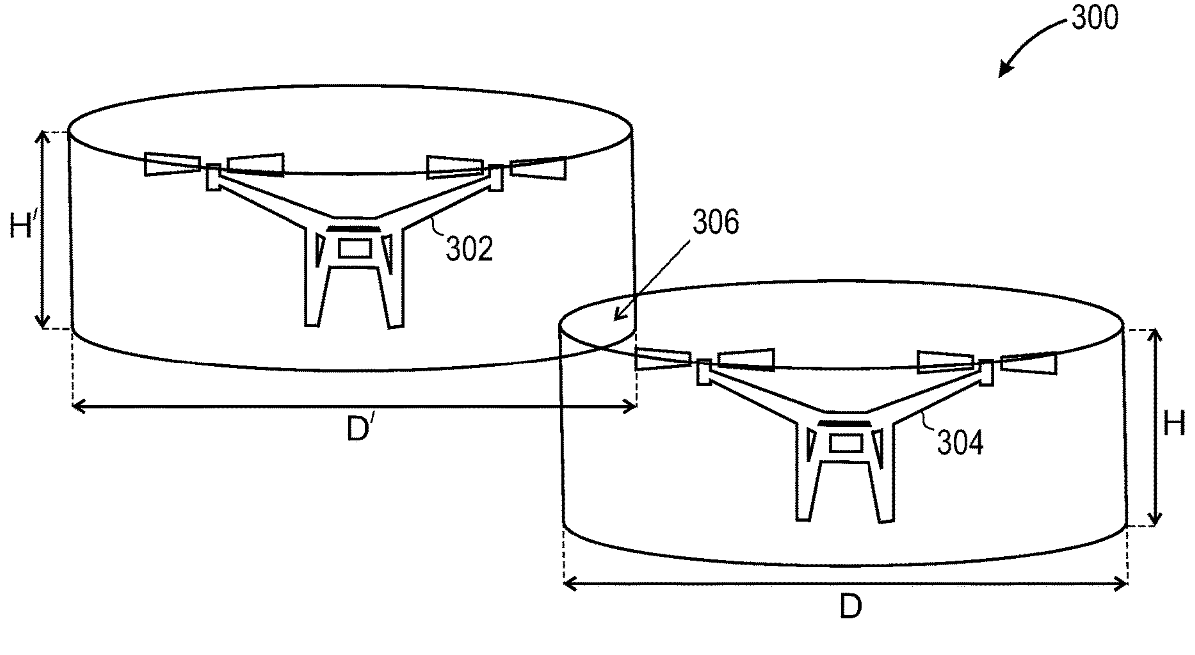
FIG. 3 is a simplified diagram illustrating an example of when a first aircraft is in conflict with a second aircraft.

FIG. 3 is a simplified diagram 300 to illustrate an example of when a first aircraft 302 is in conflict with a second aircraft 304. Specifically, two given thresholds H and D for the first aircraft 302 and two thresholds H' and D' for the second aircraft 304 form a "hockey-puck" shaped volume around each aircraft that is called the "well-clear volume." When generating flight plans for various aircraft in a particular airspace, the planned well-clear volume for one aircraft should not intersect with a well-clear volume of a second aircraft at any point in their flight plans, but as shown in FIG. 3 there is an overlap or intersection point 306 which indicates a conflict.

Accordingly, the basic problem statement for conflict detection and resolution can be stated as follows: Given a flight plan for an ownship $F_o$, a horizontal threshold D, a vertical threshold H, and a set of flight plans for traffic aircraft Φ, then generate a conflict-free flight plan $\overline{F}_o$ which means that there are no conflicts between $F_o$ and the flight plans in Φ. The basic problem can be made more challenging by imposing a set of constraints, which constraints can be designed from an aerodynamic, operational, and/or business perspective, that a solution flight plan should adhere to.

Figure 4A:
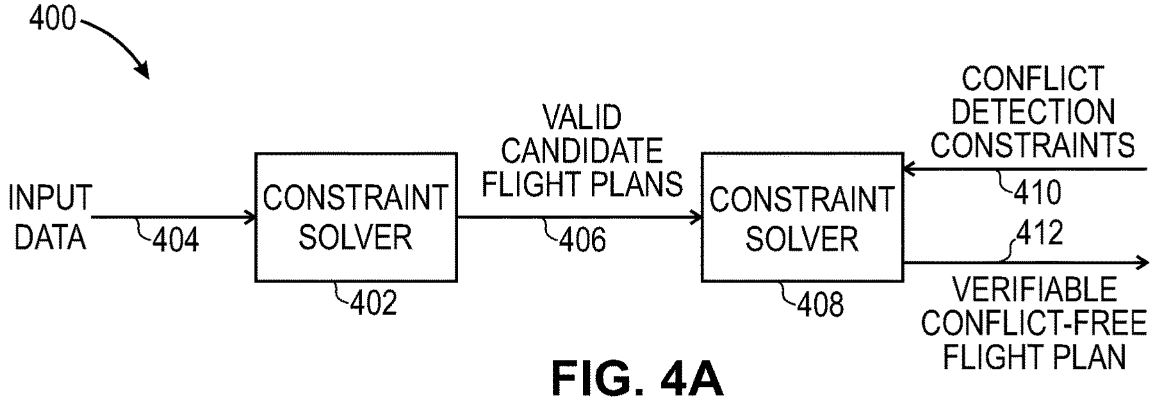
FIG. 4A is a block diagram illustrating an implementation of the data flow for generating a verifiable conflict-free flight plan for an ownship in accordance with some embodiments of the disclosure.

FIG. 4A is a block diagram illustrating the data flow 400 for generating a verifiable conflict-free flight plan 412 for an ownship in accordance with an implementation. In some embodiments, the approach for conflict detection and resolution consists of two consecutive steps that are designed as separate constraint satisfaction problems. A first constraint solver 402 receives input data 404 consisting of arbitrary aerodynamic, business and/or operational flight plan constraints provided by a user or drone owner (not shown) and then the constraint solver 402 generates 406 "valid" candidate flight plans for an ownship. Thus, the first step involves generating a plurality of valid candidate flight plans which can be defined as flight plans that take into account all of the aerodynamic, business and/or operational constraints that are desirable for a solution flight plan. However, when the constraint solver 402 cannot generate a valid candidate flight plan for an ownship based on the input data 404 (which includes aerodynamic, operational and business flight plan constraints) then in some implementations the user (such as a drone operator) is notified. In some embodiments, the constraint solver 402 is an SMT solver which generates all possible candidate flight plans by encoding the constraints in SMT-LIB and repeatedly pushing the negation of each identified candidate to the context of dReal, wherein a satisfying solution from dReal will be converted to a candidate flight plan.

In computer science and mathematical logic, satisfiability modulo theories (SMT) is the problem of determining whether a mathematical formula is satisfiable. SMT generalizes the Boolean satisfiability problem (SAT) to more complex formulas involving real number, integers, and/or various data structures such as lists, arrays, bit vectors and strings. The name is derived from the fact that these expressions are interpreted within ("modulo") a certain formal theory in first-order logic with equality (often disallowing quantifiers). "SMT-LIB" is an international initiative aimed at facilitating research and development in SMT and provides standard rigorous descriptions of background theories used in SMT systems and develops and promotes common input and output languages for "SMT solvers" which are tools that aim to solve the SMT problem for a practical subset of inputs.

dReal is an automated reasoning tool that focuses on solving problems that can be encoded as first-order logic formulas over real numbers. The strength of dReal is in handling problems that involve a wide range of nonlinear real functions. dReal implements the framework of δ-complete decision procedures and returns "unsat" or "δ-sat" on input formulas, where δ is a numerical error bound specified by the user. When the answer is "unsat" then dReal guarantees that the formula is unsatisfiable. When the answer is "δ-sat" then dReal returns a set of solutions that all satisfy a 6-perturbed form of the input formula.

Referring again to FIG. 4A, as explained above in a first step the constraint solver 402 generates a plurality of valid candidate flight plans 406. Next, the second step involves utilizing a second constraint solver 408 to analyze the generated valid candidate flight plans for conflicts. In particular, a particular valid candidate flight plan 406 (of the plurality of valid candidate flight plans which are generated) may or may not have one or more conflicts with a given set of traffic flight plans 1. Thus, in some implementations, the second constraint solver 408 receives a valid candidate flight plan from the first constraint solver and receives conflict detection constraints 410. The conflict detection constraints 410 may be provided by the regulator (such as the FAA) and must be respected by the flight plan executed by the USS and/or service provider. In some implementations, as the plurality of valid candidate flight plans 406 are generated, each one of them (each valid candidate flight plan 406) is checked by the second constraint solver 408 for possible conflicts with the elements of Φ (the elements of the given set of traffic flight plans for the airspace) and the conflict detection constraints 410. In some embodiments, the second constraint solver 408 is an SMT solver and thus the constraints 410 for conflict detection are encoded in SMT-LIB. In addition, in some implementations dReal may be utilized to check if a particular valid candidate flight plan for the ownship is conflict-free or not. Accordingly, a valid candidate flight plan 406 is returned as a "verifiable" conflict-free flight plan 412 for the ownship if and only if it is identified to be conflict-free from all the given set of traffic flight plans for the airspace (the elements of 1). In some implementations, a verifiable conflict-free flight plan 412 is transmitted to a third party for verification before it may be utilized by the operator of the ownship to fly the mission.

In summary, each valid candidate flight plan 406 generated by the first constraint solver 402 in the first step (as explained above with reference to FIG. 4A) is sent to the second constraint solver 408 to perform a second step of constraint solving for conflict analysis. In implementations utilizing SMT solvers for the first constraint solver 402 and the second constraint solver 408, if an "unsat" answer from dReal is received in the first step then there is no valid candidate flight plan that satisfies all constraints. In contrast, if an "unsat" answer is received from the second (SMT) constraint solver 408 in step two then the valid candidate flight plan 406 from the first step has no conflict with the set of traffic flight plans Φ and therefore is a verifiable conflict-free flight plan 412.

Figure 4B:
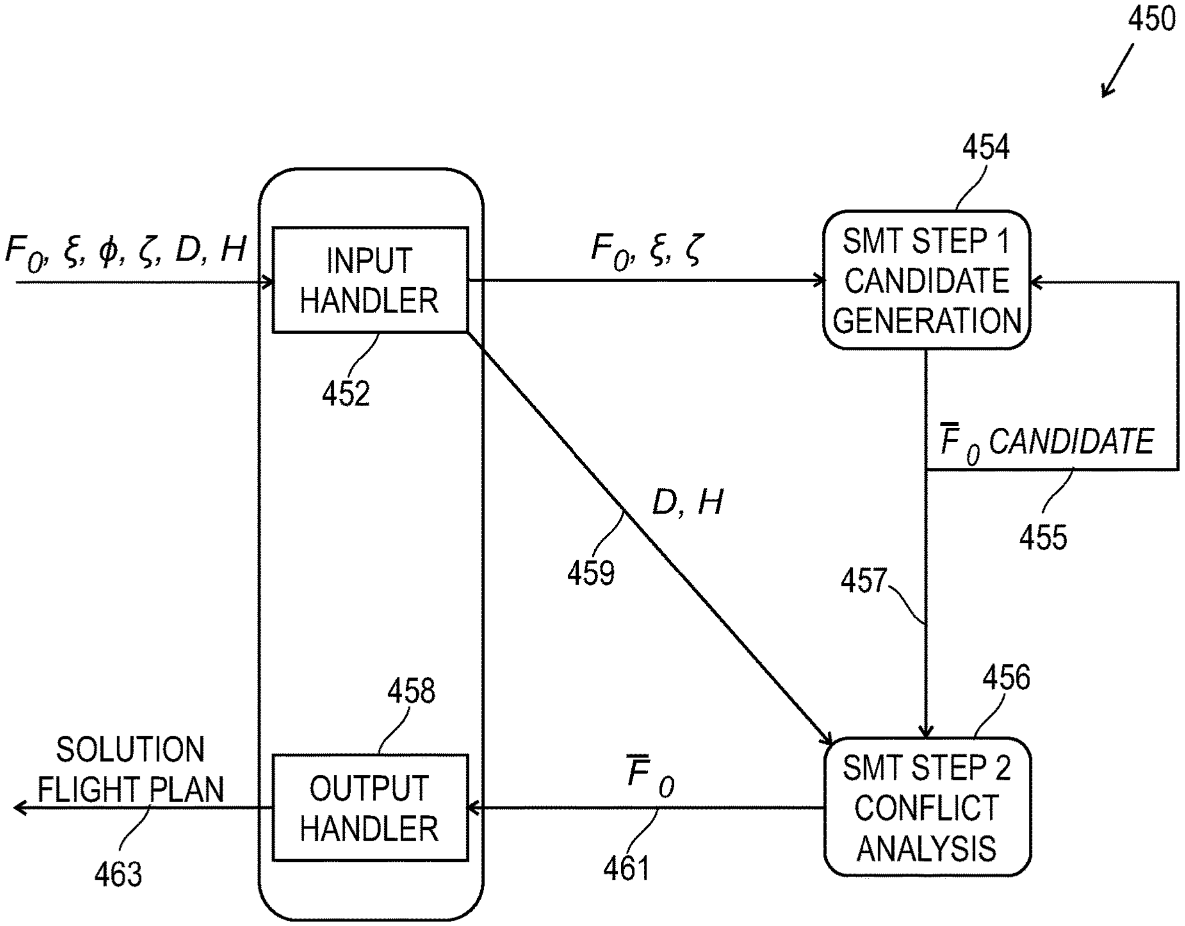
FIG. 4B is a schematic block diagram illustrating another implementation of a process for generating verifiable conflict-free flight plans for an ownship in accordance with some embodiments of the disclosure.

FIG. 4B is a schematic block diagram illustrating another implementation of a process 450 for generating verifiable conflict-free flight plans for an ownship according to some embodiments. An input handler 252 of a computer server receives a flight plan for a UAS or ownship $F_o$ from a user device. The input handler 252 also receives two or more of aerodynamic constraints, operational constraints and/or business flight plan constraints and ζ), a set of flight plans for traffic aircraft Φ in the airspace, a horizontal threshold D and a vertical threshold H (i.e., conflict detection constraints). The input handler 452 then transmits the flight plan for the ownship $F_o$ and the two or more of aerodynamic, operational and business flight plan constraints (ξ and ζ) to a first SMT solver 454. The first SMT solver 454 generates a candidate conflict free flight plan $\overline{F}_o$ that is fed back 455 to the SMT solver 454 and also transmitted 457 to a second SMT solver 456 as an input. The second SMT solver 456 also receives 459 the horizontal threshold D and the vertical threshold H from the input handler 452. The second SMT solver 456 then conducts a conflicts analysis which involves checking each candidate conflict-free flight plan $\overline{F}_o$ for conflicts with the flight plans in 1. If no conflicts are found then the SMT solver 456 returns 461 $\overline{F}_o$ to an output handler 458. In some implementations, the output handler 458 generates a "proof certificate" and transmits 463 the "solution flight plan" (or verifiable conflict-free flight plan) and the proof certificate to a third party (not shown) for verification. In some embodiments, the verifiable conflict-free flight plan may also be transmitted to the user. Accordingly, the verifiable conflict-free flight plan $\overline{F}_o$ 463 may then be used as a flight plan for the ownship $F_o$ after third party verification is confirmed.

Accordingly, the goal is to generate at least one conflict-free flight plan $\overline{F}_o$ when there are no conflicts between $\overline{F}_o$ and the flight plans in Φ. This aligns with the concept of operations for UTM, where the discovery and synchronization service (DSS) manages addresses and identifiers for elements in 1, and service providers, in the process of supporting client operations planning, gather data from relevant peer service providers in order to deconflict from, and prove awareness of, relevant active, planned or contingent operations in a given area of operation. This is required for acceptance of a proposed client operation by the DSS of that area. It should be understood that, although SMT solvers 254 and 256 are illustrated in FIG. 4B, other types of constraint solvers could be used in other implementations.

Referring again to FIG. 4B, every candidate that is generated in the first step as described above is thus sent 457 to the second step for conflict analysis. In some implementations, dReal is utilized and an "unsat" answer from dReal in the first step means that there is no valid candidate flight plan that satisfies all constraints, whereas an "unsat" answer from the constraint solver in step two indicates that the valid candidate flight plan from the first step has no conflict with the set of traffic flight plans 1.

As mentioned earlier, for a conflict to occur at a point in time, both the horizontal and vertical thresholds of two aircraft need to be violated at that time. Therefore, the fundamental intuition behind conflict resolution is to ensure the invariant that vertical and horizontal threshold violations never happen concurrently, and many different strategies can be used for ensuring this invariant. For example, either the way-points can be spatially shifted or the velocities in the flight segments can be adjusted to prevent well-clear violations (See FIG. 3 for an example of a well-clear violation). Each of these strategies can be specified as constraint satisfaction problems by identifying some appropriate constraints, and depending on the constraints the solution spaces will vary. For the sake of simplicity, in some embodiments the approach of varying the velocities in the flight segments to avoid any well-clear violations is adopted. Thus, there is a set of ground speeds ζ that the ownship can fly, but it cannot deviate spatially from its original flight plan. An appropriate ground speed from ζ is assigned to each segment of the original flight plan $F_o$ and then the vertical speed is adjusted to ensure that the three-dimensional (3D) profile of $\overline{F}_o$ remains similar to the 3D profile of $F_o$. Therefore, only the temporal profile changes for the solution flight plan. The solution space for valid candidates, therefore, is all possible permutations of ground speeds assignments to the different segments of $F_o$.

Accordingly, in some embodiments the approach taken for generating valid candidates is as follows: a set ζ of useful realistic constraints are identified and encoded in SMT-LIB for dReal to solve. A δ-sat answer from dReal indicates that there exists a valid candidate flight plan that satisfies all constraints. The negation of the solution is then pushed to the context of dReal to generate a different satisfying solution. This process continues until dReal can no longer find any valid candidates.

It should be understood that, in some implementations the process illustrated by FIG. 4B includes step 1 wherein the SMT solver 454 generates a single candidate and in step 2 the SMT solver 456 then checks that generated candidate $\overline{F}_o$ for conflicts with flight plans in 1, and that the process includes a feedback loop for generating a new candidate flight plan which means that next candidate generation and conflict checking for previously generated candidates may occur in parallel. Such operation, which includes such parallel processing, advantageously increases the speed and efficiency of the process.

FIG. 5 is a table 500 illustrating examples of the notations in column 502, the descriptions in column 504 and the SMT declarations in column 506 used for describing the conflict detection logic in an implementation. Such SMT declarations may be utilized as the input to an SMT solver in some embodiments described herein.

Accordingly, in some implementations of the processes disclosed herein, the aerodynamic constraints, operational constraints, and business constraints used for generating valid candidates may include a constraint on the velocity difference between consecutive segments. From an aerodynamic perspective, aircraft cannot accelerate or decelerate instantaneously, and therefore a valid flight plan should ensure that the difference in velocity between consecutive segments is within some practical threshold that depends on the aircraft model in question. Thus, given the set of segments S in a flight plan, this constraint can be defined as:

$$\phi_{vel} \equiv \forall_{s1,s2} \in S: |v_{xy,s2} - v_{xy,s1}| \leq \Gamma_{vel\_change}$$

where $v_{xy,s1}$ and $v_{xy,s2}$ are the velocities in s1 and s2, $T_F$ is the time of flight of the flight plan F, and $\Gamma_{vel\_change}$ is the threshold of velocity change.

An example SMT encoding for this constraint is illustrated below, where v_xy_1 and v_xy_2 are velocity variables two consecutive segments, segment 1 and segment 2 respectively, and 40 is the allowed threshold of the velocity change for the two segments.

```
(assert(<=(abs(-v_xy_1,v_xy_2))40)
```

Figure 6A:
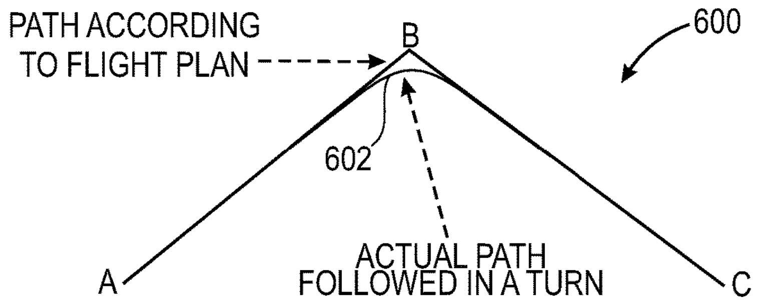
FIG. 6A illustrates a flight path according to a flight plan (from point A to point B to point C) and the actual flight path followed when the aircraft turns.

In some embodiments, a constraint on the arc length for turns may also be utilized. FIG. 6A illustrates a path 600 according to a flight plan (from point A to point B to point C) and the actual path 602 followed in a turn. At each waypoint in a flight plan (such as point B in FIG. 6A), an aircraft changes its heading and makes a turn towards the next waypoint. Due to aerodynamic constraints, certain aircraft (but not rotorcraft and drones) cannot instantaneously change direction and need to follow arc-shaped paths while making such turns (For example, see the arc 602 in FIG. 6A).

Figure 6B:
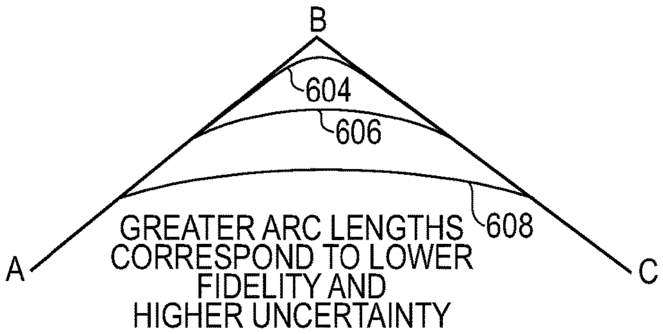
FIG. 6B illustrates the effect of arc length on the flight plan.

FIG. 6B illustrates the effect of arc length on the flight plan 610 (from point A to point B to point C) when an aircraft takes longer to make a turn. As shown, the larger the length of the arc, the more the aircraft deviates from the planned straight-line segments of the flight plan (i.e., deviates from the path A to B, and the path B to C). Thus, greater arc lengths result in lower fidelity to the original flight plan. Specifically, in FIG. 6B the flight path of an aircraft that turns in arc 604 closely adheres to the original flight plan (points A, B, C), whereas an aircraft that turns along arc 606 deviates somewhat from the original flight plan, and an aircraft that turns along arc 608 greatly deviates from the original flight plan.

Accordingly, to minimize this uncertainty it is desirable to ensure that the required arc lengths ¯a for aircraft turns remain as small as possible. The required arc length ¯a depends on the radius of turn rΦ, the change in heading Δλ, and the ground speed v (See Equation 1, below). In the absence of wind, the radius of turn depends on the ground speed $v_{xy}$ and the bank angle φ of a turn (see equation 2 below):

$$\bar{a} = ((\Delta\lambda) r\_\phi) / v\_xy \tag{1}$$

$$r\_\phi = (v\_xy\hat{}2) / (G \tan \phi) \tag{2}$$

The relationship between ¯a and $v_{xy}$ can now be stated as:

$$\bar{a} = ((\Delta\lambda) v\_xy) / (G \tan \phi)$$

For simplicity, two things may be assumed: first, to reduce the arc length, the aircraft will use the smallest possible bank angle $\varphi_s$ for the turns and the aircraft will maintain a velocity $v^{-}_{xy}$ equal to the average of the velocities in the two segments (legs A to B and legs B to C in FIG. 6B, for example) corresponding to a turn. Therefore, a constraint on the arc length can be specified in terms of the velocities of any two consecutive segments $s_1$ and $s_2$.

$$\varphi\_\text{arctan} \equiv \forall s\_1, s\_2 \in S: |((\lambda(s\_2) - \lambda\_s1) [\![ \bar{v} ]\!] \_xy) / (G \tan \phi\_s) | \Gamma\_\text{arctan}$$

where $\lambda_{s1}$ and $\lambda_{s2}$ are the headings in $s_1$ and $s_2$ respectively.

Another constraint which may be utilized, for example during flight planning, is a constraint on the total fuel cost, wherein the total fuel cost $\psi_{f,F}$ for a flight plan F can be computed as shown by Equation 3 below. In Equation 3, $T_F$ represents the total flight time and $\rho_f$ represents the fuel consumption rate of the aircraft model. Thus:

$$\psi_{f,F} = T_F \rho_f \tag{3}$$

A constraint on the total fuel consumption for a solution flight plan $F^{-}_{o}$ can then be defined as follows:

$$\phi_{fuel} \equiv \psi_{f,F^{-}_{o}} \leq \Gamma_{fuel}$$

Yet another constraint which may be utilized is a constraint on operational costs. Specifically, airline companies often associate some operational costs (See Equation 4 below) to a flight plan F by using an operational cost index $\rho_o$ that accounts for the costs of aircraft maintenance, crew salary, and the like. Thus:

$$\psi_o, F = T_F \rho_o \quad (4)$$

A constraint that takes into consideration these costs can be specified as:

$$\phi_{op} = \psi_o, \bar{F}_o \leq \Gamma_{op}$$

An airline may also wish to impose a constraint on the total flight time. Thus, a constraint on the total time of flight for a solution $\bar{F}_o$ can be imposed for operational, business, or performance reasons. Such a constraint may be specified as:

$$\phi_{TOF} = T_{\bar{F}_o} \leq \Gamma_{TOF}$$

Moreover, the airline may impose a constraint on the total delay caused by a solution flight plan $\bar{F}_o$ with respect to the original flight plan $F_o$ to ensure that an optimal solution is generated. Such a constraint may be specified as:

$$\phi_{delay} = T_{\bar{F}_o} - T_{F_o} \leq \Gamma_{delay}$$

Once a valid candidate flight plan is generated, it needs to be checked for conflicts with the available set of traffic flight plans w. This can be done by using a purely geometric framework that has a relative coordinate system which considers intervals when both aircraft maintain constant-velocity flights.

In a given interval of time $[t_0, t_1]$, it is possible to detect if two aircraft A and B have a violation of the horizontal and/or vertical thresholds D and H. For detection to be possible, the states of each aircraft at time to must be known as follows:

$(s_{x,t0,A}, s_{y,t0,A}, s_{z,t0,A}, v_{xy,t0,A}, v_{z,t0,A}, \lambda_{t0,A})$ $(s_{x,t0,B}, s_{y,t0,B}, s_{z,t0,B}, v_{xy,t0,B}, v_{z,t0,B}, \lambda_{t0,B})$ where $s_{x,t,X}$, $s_{y,t,X}$, $s_{z,t,X}$, $v_{xy,t,X}$, $v_{z,t,X}$, and $\lambda_{t,X}$ represent the coordinates in the 3D space, the horizontal and vertical velocities, and the horizontal heading respectively for an aircraft X at time t. For the well-clear volumes of A and B to intersect at any time, both the horizontal threshold and the vertical threshold need to be violated at that time. Therefore, in order for a conflict to be present in an interval $[t_0, t_1]$, it is necessary that there exist some time $t_C$ wherein:

$$t_0 \leq t_C \leq t_1$$

when both horizontal and vertical thresholds are violated. Below, we describe the mathematical logic to detect these violations independently.

In order to detect a violation of the horizontal threshold D, the x and y components of the horizontal velocities of both A and B must be found as follows:

$$v_{x,t0,A} = v_{xy,t0,A} \cos(\lambda_{t0,A})$$

$$v_{y,t0,A} = v_{xy,t0,A} \sin(\lambda_{t0,A})$$

$$v_{x,t0,B} = v_{xy,t0,B} \cos(\lambda_{t0,B})$$

$$v_{y,t0,B} = v_{xy,t0,B} \sin(\lambda_{t0,B})$$

Their relative positions and velocities in the xy plane are then calculated as:

$$s_{x,t0} = s_{x,t0,A} - s_{x,t0,B}$$

$$s_{y,t0} = s_{y,t0,A} - s_{y,t0,B}$$

$$v_{x,t0} = v_{x,t0,A} - v_{x,t0,B}$$

$$v_{y,t0} = v_{y,t0,A} - v_{y,t0,B}$$

Next, given the relative horizontal positions and the relative horizontal velocities, it is possible to find the times at which the horizontal threshold D is violated by finding the roots of Equation 5 (below) where $a = v^2_{x,t0} + v^2_{y,t0}$, $b = 2(s_{x,t0} v_{x,t0} + s_{y,t0} v_{y,t0})$, and $c = s^2_{x,t0} + s^2_{y,t0} - D^2$. If any root t' is found such that $t_0 \leq t_0, +t' \leq t_1$, then the horizontal threshold is violated at time $t_0 + t'$.

$$at^2 + bt + c = 0 \quad (5)$$

In order to detect a violation of the vertical threshold H, the relative vertical position and velocity for the aircraft are computed as follows:

$$s_{z,t0} = s_{z,t0,A} - s_{z,t0,B}$$

$$v_{z,t0} = v_{z,t0,A} - v_{z,t0,B}$$

Now, at any time t, the vertical separation is given by $s_{z,t0} + v_{z,t0}(t - t_0)$. Therefore, for a vertical threshold violation to exist at a time t, Equation 6 needs to be satisfied.

$$|s_{z,t0} + v_{z,t0}(t - t_0)| \leq H \quad (6)$$

The conflict constraint logic described earlier works if and only if both aircraft maintain constant-velocity flight paths in the interval $[t_0, t_1]$. Therefore, given two flight plans $F_a$ and $F_b$ for a traffic aircraft, the temporal dimension must be discretized into a set $I_{Fa,Fb}$ of consecutive intervals where it is known that both aircraft maintain constant velocities. Each of these intervals can be then checked for conflicts independently to determine if there is a conflict between the two flight plans. The conflict $(\bar{F}_a, F_b)$ predicate returns true if and only if at some interval $[t_0, t_1] \in I_{Fa,Fb}$ there is some time $t_C$ such that $t_C - t_0$ satisfies Equation 5 and $t_C$ satisfies Equation 6 above.

Given a set of traffic flight plans $\Phi$, any correct solution $\bar{F}_o$ should satisfy the constraint that it will be conflict-free from any member of the set $\Phi$. Therefore, the conflict constraint can be specified as:

$$\phi_{conflict} = \forall F_i \in \Phi : \neg \text{conflict}(\bar{F}_o, F_i)$$

In addition, the conflict detection approach using flight plans can be easily generalized to detect conflicts with stationary objects. This can be done by modeling an object as a well-clear volume with a flight plan consisting of a single waypoint, wherein at all times the volume remains stationary at that same waypoint. For example, if an obstacle is present at the 3D position $s_{x,o}$, $s_{y,o}$, $s_{z,o}$, then its state at any time t can be represented by $(s_{x,o}, s_{y,o}, s_{z,o}, 0.0, 0.0, 0.0)$, which allows the conflict detection logic described above to work for detecting conflicts with such an object. The horizontal and vertical thresholds for stationary objects can be chosen as desired.

The processes disclosed herein improve upon existing methods for generating conflict-free flight plans by presenting the problem of conflict detection and resolution as a constraint satisfaction problem. Moreover, in some implementations dReal is utilized to solve the problem. Such a characterization makes it possible to advantageously employ state-of-the-art constraint solvers, such as SMT solvers, to find solutions. The use of SMT solvers allows for encoding arbitrary aerodynamic and/or operational constraints on resolutions. This also makes the approach appropriate for safety-critical aerospace systems because the solutions generated by SMT solvers can be easily verified for correctness. The declarative paradigm advantageously allows the encoding of complex properties that can easily be verified for correctness and also makes it possible to encode a wide variety of desirable constraints in addition to conflict elimination. Thus, machine-checkable proofs can be generated from SMT solvers and therefore proof certificates can also be generated for an unsatisfiable solution that detail how to derive a contradiction from the inputs. Thus, a solution generated for a satisfiability problem by an SMT solver can have a high degree of confidence associated with it since a satisfiable solution can be checked by straightforward means and proof certificates can be generated for an unsatisfiable solution that detail how to derive a contradiction from the inputs. Moreover, the proofs from an SMT solver can be independently checked by third-party theorem provers. Beneficially, the high-degree of confidence directly provided by SMT solvers makes this approach appropriate for safety-critical aerospace applications.

In addition, embodiments disclosed advantageously provides a strategic conflict detection and resolution process that involves setting up the task as a constraint satisfaction problem and using SMT solvers to find valid solutions. Such processes allow for encoding additional constraints in SMT-LIB to find valid solutions which are not just conflict-free but that also satisfy some desirable aerodynamic, business, and operational constraints. Accordingly, the declarative nature of the processes disclosed herein means that users need only provide desired constraints (such as operational and/or safety constraints) such that the users specify the "what" but do not have to deal with the "how" because the constraint solvers (which may be SMT solvers) take care of the "how" automatically.

Figure 7:
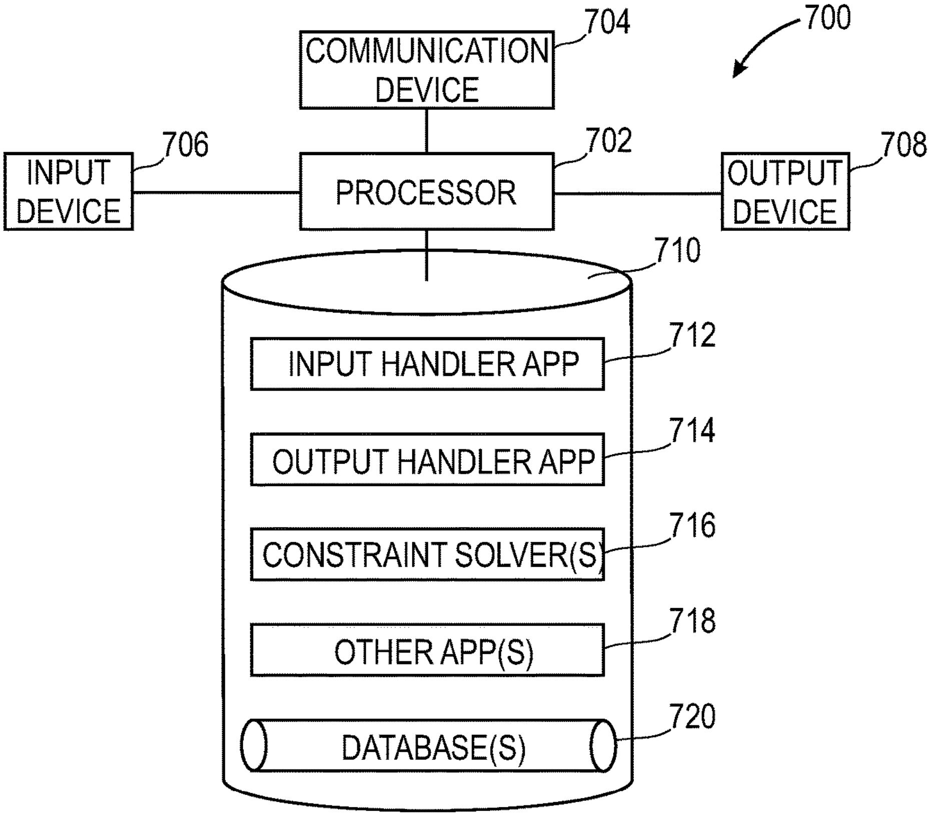
FIG. 7 is a block diagram of a computer system for illustrating aspects according to some embodiments of the disclosure.

Note that embodiments of the processes described herein may be implemented using any number of different hardware configurations. For example, FIG. 7 is a block diagram of a computer system 700 that may be, for example, associated with the computer 208 shown in FIG. 1. The computer system 700 may include standard components and/or custom-designed components and/or proprietary components in terms of its hardware and/or its architecture and may be controlled by software and/or computer program instructions to cause it to function as described herein. For example, the computer system 700 may include server computer hardware.

Referring to FIG. 7, the computer system 700 may include a processor 702 operatively coupled to a communication device 704, an input device 706, an output device 708, and a storage device 710. The processor 702 may be constituted by one or more processors (one or more of which may be custom designed), and operates to execute processor-executable steps, contained in program instructions as described herein so as to control the computer system 700 to provide desired functionality.

Communication device 704 may be used to facilitate communication with, for example, other devices (such as one or more user mobile devices, and/or one or more computers or server computers operated by, for example, a flight authorization service (FA) or government agency or regulatory body as shown in FIG. 2). For example, communication device 704 may comprise numerous communication ports (not separately shown), to allow the computer system 700 to communicate simultaneously with a number of other computers and other devices, including communications as required to generate and/or transmit candidate flight plans and/or verified flight plans. Thus, the communication device 704 may be configured for wireless communications and/or wired communications via various different types of networks, such as the Internet.

Input device 706 may comprise one or more of any type of peripheral device typically used to input data into a computer. For example, the input device 506 may include a keyboard and a mouse and/or a touchscreen. Output device 708 may comprise, for example, a display and/or a printer. In some embodiments, the input device 706 and the output device 708 comprise a touch screen.

Storage device 710 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory devices, such as solid-state drives (SSDs), and the like. Any one or more of such information storage devices may be considered to be a non-transitory computer-readable storage medium or computer usable medium or memory.

Storage device 710 stores one or more computer programs for controlling the processor 702. The programs comprise program instructions (which may be referred to as computer readable program code means) that contain processor-executable process steps of the computer system 700, which instructions when executed by the processor 702 cause the computer system 700 to function as described herein.

The programs may include one or more conventional operating systems (not shown) that control the interoperability processor 702 to manage and coordinate activities and sharing of resources in the computer system 700, and to serve as a host for application programs that run on the computer system 700.

For example, the storage device 710 may store an input handler application 712, an output handler application 714, one or more constraint solver applications 716 and one or more other application(s) 718 that when executed control the processor 702 to enable the computer system 700 to, for example, receive constraint data and other forms of data, generate candidate flight plans for an aircraft, generate verifiable flight plans for the aircraft and transmit the verifiable flight plans to a third party. The output handler application 714 may also include processor executable instructions that when executed controls the process 702 to generate a proof certificate for each verifiable flight plan and, in some implementations, transmit the proof certificate to a third party and/or to the owner of the aircraft.

The storage device 710 may also store, and the computer system 700 may also execute, other instructions, applications and/or programs, which are not shown. For example, such programs may include a verifiable flight plan reporting application, which transmits the verifiable flight plans to third parties and/or to pilots or owners of the aircraft. Other programs can also include, e.g., one or more data communication programs, database management programs, device drivers, and the like.

The storage device 710 may also include one or more databases 720 required for operation of the interoperability server computer 700. Such databases may include, for example, aircraft regulatory requirements, local airspace information and/or the like.

Figure 8:
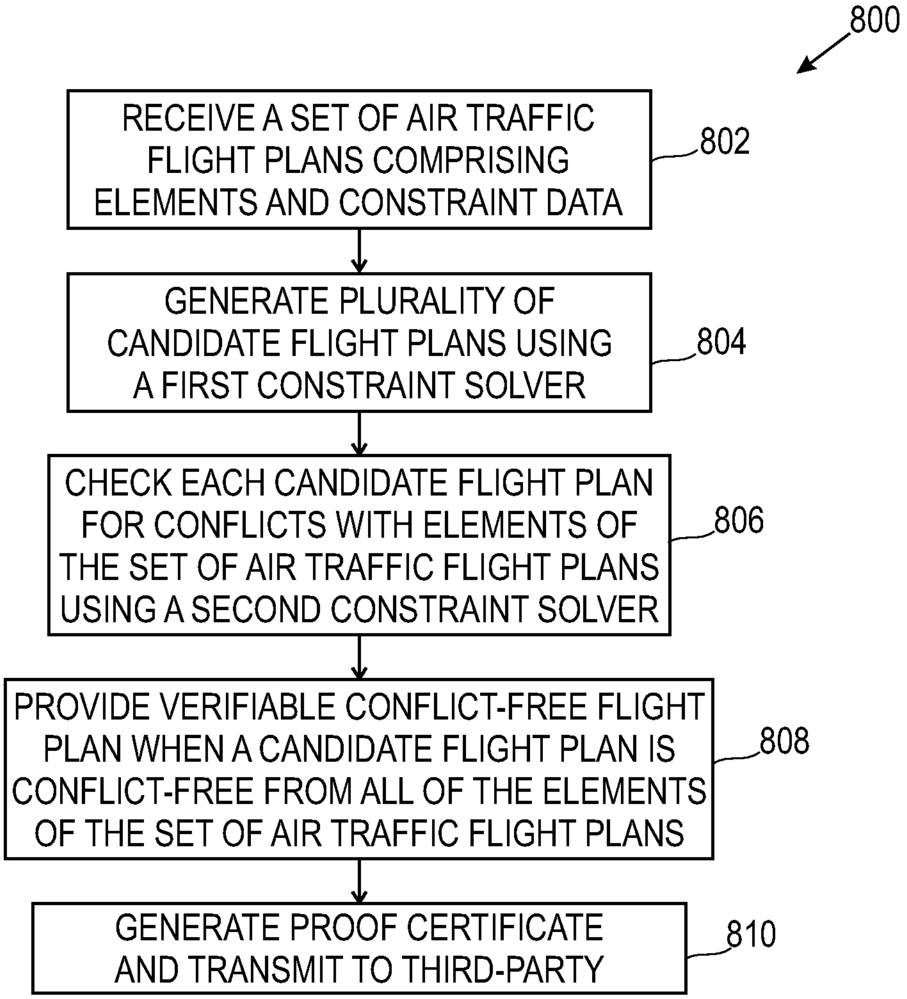
FIG. 8 is a flowchart of an implementation of a verifiable conflict-free flight plan process for an ownship in accordance with some embodiments of the disclosure.

FIG. 8 is a flowchart of an implementation of a verifiable conflict-free flight plan process 800 for an aircraft in accordance with some embodiments of the disclosure. Specifically, a server computer receives 802, from a user device, a set of air traffic flight plans of an airspace comprising elements and constraint data. The constraint data may include aerodynamic constraint data, business constraint data and/or operational constraint data for an unmanned aircraft system (UAS). The server computer then generates 804, utilizing a first constraint satisfaction solver, a plurality of candidate flight plans based on at least two of the aerodynamic constraint data, the business constraint data and the operational constraint data. Next, the server computer checks 806, utilizing a second constraint solver, every generated candidate flight for conflicts with the elements of the set of air traffic flight plans for the airspace. The server computer then provides 808, using the second constraint solver, at least one verifiable conflict-free flight plan from the plurality of candidate flight plans when a candidate conflict-free flight plan is conflict-free from all of the elements of the set of air traffic flight plans. In some embodiments, the server computer generates 810 a proof certificate for the verifiable conflict-free flight plan and transmits it to a third-party server to enable formal verification of the verifiable conflict-free flight plan.

In some embodiments of the process 800 shown in FIG. 8, the server computer also transmits the verifiable conflict-free flight plan to the user device. In addition, the first constraint satisfaction solver and/or the second constraint satisfaction solver may be Satisfiability Modulo Theories (SMT) solvers. Also, the business constraint data may include at least one of total fuel cost constraint data and total operational cost constraint data, and the operational constraint data may include at least one of air risk data, ground risk data, arc length constraint data, operational area data, operational volume data, altitude data, and total flight time constraint data.

In embodiments disclosed herein an authoritative registry of constraints, restrictions and flight plans for an airspace may be provided by a regulator and/or registered and/or authorized flight plan service provider. Moreover, in some implementations a plurality of users (N users) of the authoritative registry are required to transmit a plurality of flight plans (M flight plans) to the registry for storage therein, wherein each M flight plan, before it is added to the registry, must be verified (i.e., that its conflict-free) against the registry as disclosed herein. In addition, such an authoritative registry may operate in a manner having first in, first out queuing and may also have priority queues. Moreover, users may be notified when a verified conflict-free flight plan is added to the registry.

Figure 9:
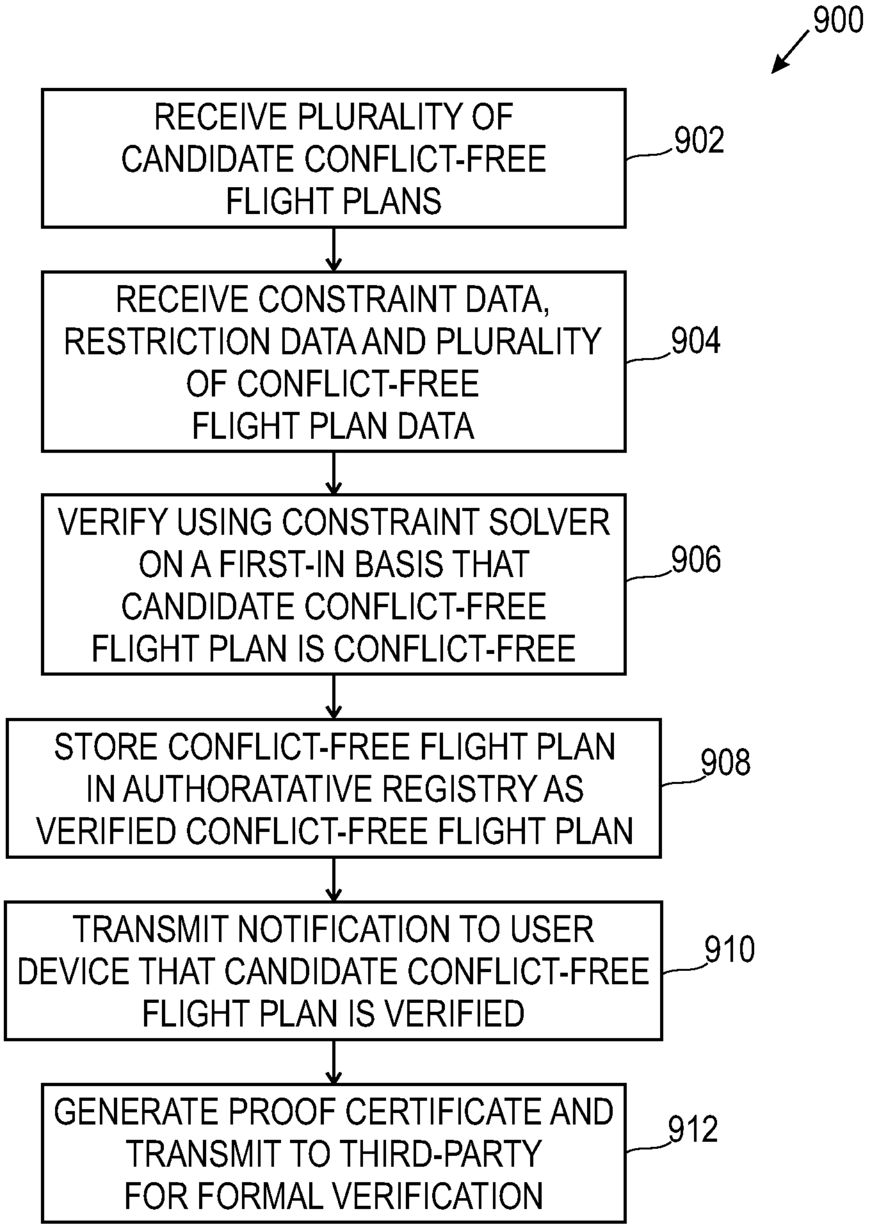
FIG. 9 is a flowchart of an implementation for updating an authoritative conflict-free flight plan directory in accordance with some embodiments.

FIG. 9 is a flowchart 900 of an implementation for updating an authoritative conflict-free flight plan directory according to some embodiments. A server computer associated with an authoritative flight plan registry receives 902 a plurality of candidate conflict-free flight plans for an airspace from a plurality of user devices, then retrieves 904 from a database constraint data for the airspace, restriction data for the airspace, and a plurality of verified conflict-free flight plan data associated with the airspace. Next, the server computer verifies 906, on a first-in basis using a constraint satisfaction solver, that a candidate conflict-free flight plan of the plurality of candidate conflict-free flight plans is conflict-free, and then stores 908 in the authoritative flight plan registry, the candidate conflict-free flight plan as a verified conflict-free flight plan. In some implementations, verifying that a candidate conflict-free flight plan of the plurality of candidate conflict-free flight plans is conflict-free includes the server computer determining that no conflicts exist between data defining the candidate conflict-free flight plan and the constraint data, the restriction data, and data defining the verified conflict-free flight plan data.

Referring again to FIG. 9, in some embodiments the server computer also transmits 910 to a user device, a notification that the candidate conflict-free flight plan has been verified. In addition, in some implementations the server computer generates 912 a proof certificate for the verified conflict-free flight plan and transmits it to a third-party for formal verification.

In some implementations of the process illustrated by FIG. 9, the server computer may determine, after retrieving the constraint data for the airspace, the restriction data for the airspace, and the plurality of verified conflict-free flight plans associated with the airspace using a constraint satisfaction solver, that a candidate conflict-free flight plan of the plurality of candidate conflict-free flight plans is not conflict-free. In such a situation, the server computer then rejects the candidate conflict-free flight plan and transmits a rejection notification to a user device associated with the rejected candidate conflict-free flight plan.

Thus, embodiments may provide technical improvements to aircraft conflict detection and elimination. Specifically, in embodiments of the processes disclosed herein the separation of flight plan candidate generation and conflict resolution enables running these two processes in parallel which may lead to faster execution times. Moreover, the user need only declaratively specify the desirable properties of a valid solution rather than concretely specify the logical steps to execute for generating the solution. This approach improves flexibility because different constraints can be added and/or removed. Thus, the user need only specify the "what" and the constraint solvers automatically take care of the "how." In addition, the declarative paradigm allows the encoding of complex properties that can easily be verified for correctness by the constraint solver and also makes it possible to encode a wide variety of desirable constraints in addition to conflict elimination. Furthermore, proof certificates can be beneficially generated by the solver in the case where there is no conflict, which certificates can be leveraged to certify the software and/or the flight plan solutions to increase people's trust in the solver's result(s). Consequently, the use of solvers makes the disclosed processes scalable over complex constraints and allows the use of different approaches for conflict detection (for example, an encounter model and/or a kinematics model) as different approaches allow constraints to be developed differently. Moreover, the workflow is not bound by the complexity of the airspace and is amenable to optimization by optimizing the backend SMT constraint solvers.

As used herein and in the appended claims, the term "computer" should be understood to encompass a single computer or two or more computers in communication with each other. In addition, as used herein and in the appended claims, a "server" includes a computer device or system that responds to numerous requests for service from other devices.

Also, as used herein and in the appended claims, the term "processor" should be understood to encompass a single processor or two or more processors in communication with each other. In addition, as used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable, including simultaneous performance of steps, and/or in an order that omits one or more steps.

Although specific hardware and data configurations have been described herein, note that any number of other configurations may be provided in accordance with embodiments of the present invention (e.g., some of the information associated with the databases described herein may be combined or stored in external systems). Thus, it should be understood that the present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A method for generating verifiable conflict-free flight plans for aircraft comprising: receiving, by a server computer from a user device, a set of air traffic flight plans for an airspace comprising elements and at least two of aerodynamic constraint data, business constraint data and operational constraint data for an aircraft;

generating, by the server computer utilizing a first constraint satisfaction solver, a plurality of candidate flight plans for the aircraft based on the at least two of the aerodynamic constraint data, the business constraint data and the operational constraint data;

checking, by the server computer utilizing a second constraint satisfaction solver as each candidate flight plan is generated, for conflicts with the elements of the air traffic flight plans for the airspace, the second constraint satisfaction solver comprises a Satisfiability Modulo Theories (SMT) solver, the SMT solver being capable of solving a non-boolean constraint; and providing, by the server computer using the second constraint satisfaction solver, at least one verifiable conflict-free flight plan for the aircraft from the plurality of candidate flight plans when a candidate flight plan is conflict-free from all of the elements of the set of air traffic flight plans.

2. The method of claim 1, further comprising generating, by the server computer, a proof certificate for the verifiable conflict-free flight plan.

3. The method of claim 2, further comprising transmitting, by the server computer to a third-party server, the proof certificate for enabling formal verification of the verifiable conflict-free flight plan.

4. The method of claim 3, further comprising transmitting, by the server computer, the verifiable conflict-free flight plan to at least one of the user device and an authoritative registry of flight plans.

5. The method of claim 1, wherein the business constraint data comprises at least one of total fuel cost constraint data and total operational cost constraint data.

6. The method of claim 1, wherein the operational constraint data comprises at least one of operational risk data, arc length constraint data, operational area data, operational volume data, altitude data, and total flight time constraint data.

7. An apparatus for generating verifiable conflict-free flight plans for aircraft comprising:

a processor;

a communication device operably connected to the processor; and a storage device operably connected to the processor, wherein the storage device comprise processor executable instructions which when executed cause the processor to:

receive a set of air traffic flight plans for an airspace comprising elements and at least two of aerodynamic constraint data, business constraint data and operational constraint data for an aircraft;

generate, utilizing a first constraint satisfaction solver, a plurality of candidate flight plans for the aircraft based on the at least two of the aerodynamic constraint data, the business constraint data and the operational constraint data;

check, utilizing a second constraint satisfaction solver as each candidate flight plan is generated, for conflicts with the elements of the air traffic flight plans, the second constraint satisfaction solver comprises a Satisfiability Modulo Theories (SMT) solver, the SMT solver being capable of solving a non-boolean constraint; and provide, using the second constraint satisfaction solver, at least one verifiable conflict-free flight plan for the aircraft from the plurality of candidate flight plans when the verifiable conflict-free flight plan is conflict-free from all of the elements of the set of traffic flight plans.

8. The apparatus of claim 7, wherein the storage device comprises further processor executable instructions which when executed cause the processor to generate a proof certificate for the verifiable conflict-free flight plan.

9. The apparatus of claim 8, wherein the storage device comprises further processor executable instructions which when executed cause the processor to transmit the proof certificate to a third-party server enabling formal verification of the verifiable conflict-free flight plan.

10. The apparatus of claim 9, wherein the storage device comprises further processor executable instructions which when executed cause the processor to transmit the verifiable conflict-free flight plan to at least one of a user device and an authoritative registry of flight plans.

11. The apparatus of claim 7, wherein the business constraint data comprises at least one of total fuel cost constraint data and total operational cost constraint data.

12. The apparatus of claim 7, wherein the operational constraint data comprises at least one operational risk data, arc length constraint data, operational area data, operational volume data, altitude data, and total flight time constraint data.

13. A method for updating an authoritative conflict-free flight plan directory comprising: receiving, by a server computer associated with an authoritative flight plan registry from a plurality of user devices, a plurality of candidate conflict-free flight plans for an airspace;

retrieving, by the server computer from a database, constraint data for the airspace, restriction data for the airspace, and a plurality of verified conflict-free flight plans associated with the airspace;

verifying on a first-in basis, by the server computer using a constraint satisfaction solver, that a candidate conflict-free flight plan of the plurality of candidate conflict-free flight plans is conflict-free, the constraint satisfaction solver comprises a Satisfiability Modulo Theories (SMT) solver, the SMT solver being capable of solving a non-boolean constraint; and storing, by the server computer in the authoritative flight plan registry, the candidate conflict-free flight plan as a verified conflict-free flight plan.

14. The method of claim 13, wherein verifying that a candidate conflict-free flight plan of the plurality of candidate conflict-free flight plans is conflict-free comprises determining, by the server computer, that no conflicts exist between data defining the candidate conflict-free flight plan and the constraint data, the restriction data, and data defining the verified conflict free flight plan data.

15. The method of claim 13, further comprising transmitting, by the server computer to at least a user device of the plurality of user devices, a notification that the candidate conflict-free flight plan has been verified.

16. The method of claim 13, further comprising generating, by the server computer, a proof certificate for the verified conflict-free flight plan.

17. The method of claim 16, further comprising transmitting, by the server computer to a third party, the proof certificate for formal verification.

18. The method of claim 13, further comprising, after retrieving the constraint data for the airspace, the restriction data for the airspace, and the plurality of verified conflict-free flight plans associated with the airspace:

determining, by the server computer using a constraint satisfaction solver, that a candidate conflict-free flight plan of the plurality of candidate conflict-free flight plans is not conflict-free;

rejecting, by the server computer, the candidate conflict-free flight plan; and transmitting, by the server computer to a user device of the plurality of user devices associated with the candidate conflict-free flight plan, a rejection notification.

* * * * *